United States Patent
Lin

(10) Patent No.: US 8,013,581 B2
(45) Date of Patent: Sep. 6, 2011

(54) POWER SUPPLY CIRCUIT WITH STAND-BY CONTROL CIRCUIT AND ENERGY STORAGE CIRCUIT

(75) Inventor: Ching-Chung Lin, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 459 days.

(21) Appl. No.: 12/286,384

(22) Filed: Sep. 29, 2008

(65) Prior Publication Data

US 2009/0085655 A1    Apr. 2, 2009

(30) Foreign Application Priority Data

Sep. 28, 2007  (CN) .......................... 2007 1 0123701

(51) Int. Cl.
  *G05F 1/00*    (2006.01)

(52) U.S. Cl. ...................................... 323/272
(58) Field of Classification Search .................. 323/271, 323/272; 307/43; 713/320, 323, 324
  See application file for complete search history.

(56) References Cited

U.S. PATENT DOCUMENTS

| 4,608,625 | A   | 8/1986  | Josephson et al. |         |
|-----------|-----|---------|------------------|---------|
| 6,107,698 | A * | 8/2000  | Ochiai et al.    | 307/43  |
| 7,602,158 | B1* | 10/2009 | Iacob            | 323/231 |
| 2002/0178390 | A1* | 11/2002 | Lee           | 713/320 |

FOREIGN PATENT DOCUMENTS

| CN | 1248089 A | 3/2000 |
| CN | 2452222 Y | 10/2001 |
| CN | 2694667 Y | 4/2005 |
| CN | 1735169 A | 2/2006 |
| CN | 1989676 A | 6/2007 |
| CN | 2919318 Y | 7/2007 |

* cited by examiner

*Primary Examiner* — Jue Zhang
(74) *Attorney, Agent, or Firm* — Altis Law Group, Inc.

(57) ABSTRACT

An exemplary power supply circuit configured for supply power for a load includes: a main power supply configured for converting received voltages into required direct current voltages; a microprocessor configured for providing control signals; a stand-by control circuit configured for controlling the main power supply; an energy storage circuit configured for supplying the stand-by control circuit. When the load stops operating, the microprocessor outputs a control signal to the stand-by control circuit, the stand-by control circuit outputs a corresponding control signal to turn off the main power supply. In response to when the load starts operating, the stand-by control circuit outputs a corresponding control signal to turn on the main power supply, and the main power supply charges the energy storage circuit.

20 Claims, 4 Drawing Sheets

POWER SUPPLY CIRCUIT WITH STAND-BY CONTROL CIRCUIT AND ENERGY STORAGE CIRCUIT

FIELD OF THE INVENTION

The present invention relates to power supply circuits, and particularly to a power supply circuit with a stand-by control circuit and an energy storage circuit.

GENERAL BACKGROUND

FIG. 7 is a schematic view of a conventional power supply circuit. The power supply circuit 1 includes a first input terminal 2, a second input terminal 3, a relay 4, a main power supply 5, an assistant power supply 6, a microprocessor 7, and a switch 8. The assistant power supply 6 includes a transformer 9 and a commutating and filter circuit (not labeled).

The first input terminal 2 is connected to the main power supply 5, and the second input terminal 3 is connected to the main power supply 5 via the relay 4. The main power supply 5 is connected to a load (not shown). The transformer 9 includes a primary winding (not labeled) and a secondary winding (not labeled). The primary winding includes two terminals (not labeled). One of the terminals of the primary winding is connected to the first input terminal 2, and the other terminal is connected to the second input terminal 3. The secondary winding is connected to the microprocessor 7 via the commutating and filter circuit. The relay 4 includes an inductance coil (not labeled), and the inductance coil includes two terminals (not labeled). One of the terminals of the inductance coil is connected to the microprocessor 7, and the other terminal is connected to ground. The microprocessor 7 is connected to ground via the switch 8.

An alternating current (AC) voltage is inputted into the assistant power supply 6 and converted into a direct current (DC) voltage by the transformer 9 and the commutating and filter circuit. The DC voltage is supplied to the microprocessor 7 to enable the microprocessor 7 to function.

When a user presses the switch 8, the switch 8 correspondingly generates a first pulse signal. The microprocessor 7 receives the first pulse signal and correspondingly outputs a first control signal to turn on the relay 4. The AC voltage is inputted into the main power supply 5 via the first input terminal 2, the second input terminal 3, and the relay 4. The main power supply 5 converts the AC voltage into required voltages to supply the load.

When the user presses the switch 8 again, the switch 8 correspondingly generates a second pulse signal. The microprocessor 7 receives the second pulse signal and correspondingly outputs a second control signal to turn off the relay 4. The main power supply 5 outputs no voltage, and the load stops operating correspondingly. That is, the power supply circuit 2 is in a stand-by state.

Although the power supply circuit 2 is in the stand-by state, the AC voltage is still inputted into the assistant power supply 6. The DC voltage outputted from the assistant power supply 6 is still supplied to the microprocessor 7. That is, when the power supply circuit 2 is in the stand-by state, energy consumption is large.

What is needed, therefore, is a power supply circuit that can overcome the above-described deficiencies.

SUMMARY

A power supply circuit configured for supplying power for a load includes: a main power supply configured for converting a received voltage into a required direct current voltage; a microprocessor; a stand-by control circuit configured for controlling the main power supply; an energy storage circuit configured for supplying power for the stand-by control circuit. When the load stops operating, the microprocessor outputs a control signal to the stand-by control circuit, the stand-by control circuit outputs a corresponding control signal to turn off the main power supply. In response to when the load starts operating, the stand-by control circuit outputs a corresponding control signal to turn on the main power supply, and the main power supply charges the energy storage circuit.

Other novel features and advantages will become more apparent from the following detailed description when taken in conjunction with the accompanying drawings.

DETAILED DESCRIPTION

Reference will now be made to the drawings to describe certain inventive embodiments of the present disclosure in detail.

Figure 1:
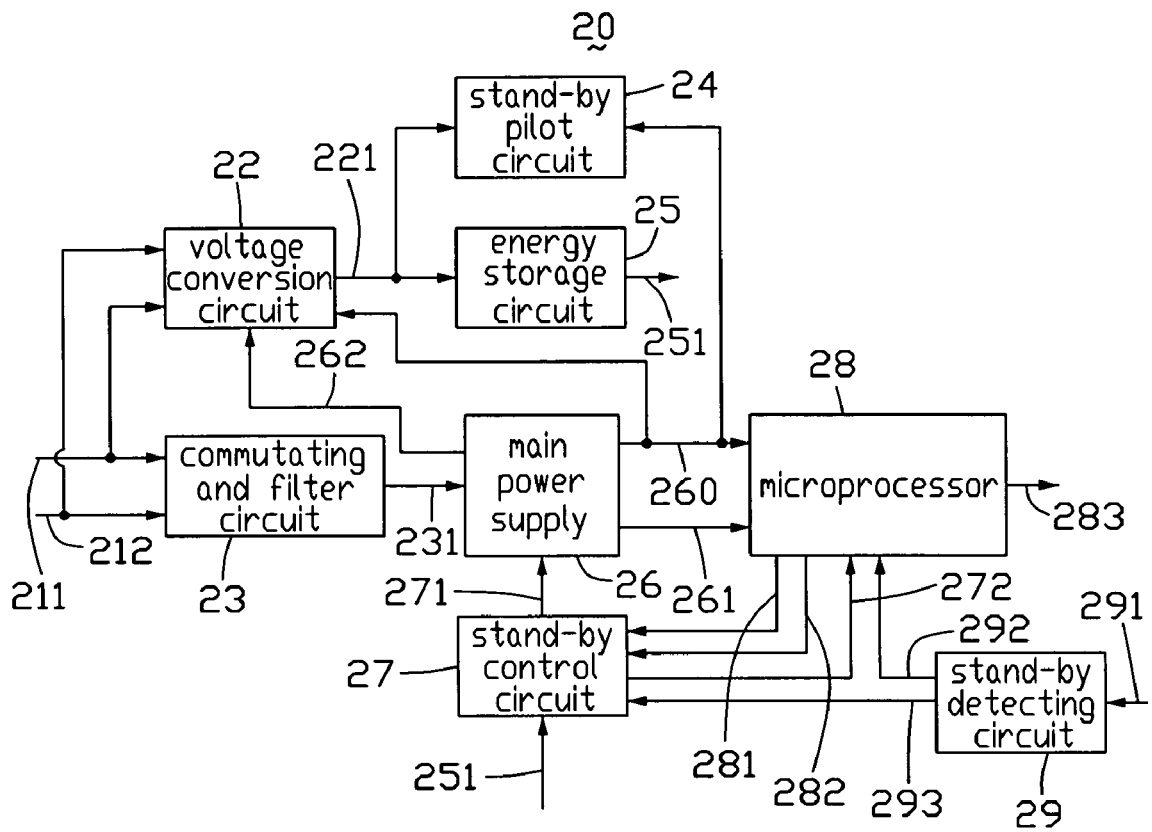
FIG. 1 is a schematic view of a power supply circuit according to a first embodiment of the present disclosure, the power supply circuit including a voltage conversion circuit, a commutating and filter circuit, a stand-by pilot circuit, an energy storage circuit, a main power supply, a stand-by control circuit, a microprocessor, and a stand-by detecting circuit.

FIG. 1 is a schematic view of a power supply circuit 20 according to a first embodiment of the present disclosure. In one embodiment, the power supply circuit 20 includes a first input terminal 211, a second input terminal 212, a voltage conversion circuit 22, a commutating and filter circuit 23, a stand-by pilot circuit 24, an energy storage circuit 25, a main power supply 26, a stand-by control circuit 27, a microprocessor 28, and a stand-by detecting circuit 29.

An AC voltage is inputted into the commutating and filter circuit 23 via the first input terminal 211 and the second input terminal 212. The commutating and filter circuit 23 converts the AC voltage into a DC voltage. The commutating and filter circuit 23 includes an output terminal 231. The DC voltage is supplied to the main power supply 26 via the output terminal 231. The AC voltage is also supplied to the voltage conversion circuit 22 via the first input terminal 211 and the second input terminal 212.

The main power supply 26 converts the DC voltage into required DC voltages for a device employing the power supply circuit 20. In one embodiment, the main power supply may convert the DC voltage into, for example, 26V and 5V. In one embodiment, the main power supply 26 includes a first output terminal 260, a second output terminal 261, and a third output terminal 262. The main power supply 26 supplies DC power for the microprocessor 28 via the first output terminal 260 and the second output terminal 261, and supplies DC power for the voltage conversion circuit 22 via the first output terminal 260 and the third output terminal 262.

The voltage conversion circuit 22 includes an output terminal 221. The voltage conversion circuit 22 supplies DC power for the stand-by pilot circuit 24 and the energy storage circuit 25 via the output terminal 221.

The stand-by pilot circuit 24 receives the DC voltage from the first output terminal 260 of the main power supply 26 and displays operation conditions of the main power supply 26. The operation conditions of the main power supply 26 includes a stand-by condition, an operating normally condition, and so on.

The energy storage circuit 25 includes an output terminal 251. The energy storage circuit 25 supplies power for the stand-by control circuit 27 via the output terminal 251.

The stand-by detecting circuit 29 includes an input terminal 291, a first output terminal 292, and a second output terminal 293. The stand-by detecting circuit 29 detects operation conditions of a load (not shown) via the input terminal 291, and outputs correspondingly control signals to the microprocessor 28 via the first output terminal 292 and the stand-by control circuit 27 via the second output terminal 293. The load can be a liquid crystal display panel for example.

The stand-by control circuit 27 includes a first output terminal 271 and a second output terminal 272. The stand-by control circuit 27 outputs control signals to control the main power supply 26 via the first output terminal 271, and outputs control signals to control the microprocessor 28 via the second output terminal 272.

The microprocessor 28 includes a first output terminal 281, a second output terminal 282, and a third output terminal 283. The microprocessor 28 outputs control signals to the stand-by control circuit 27 via the first output terminal 281 and the second output terminal 282, and outputs control signals to the load via the third output terminal 283.

Figure 2:
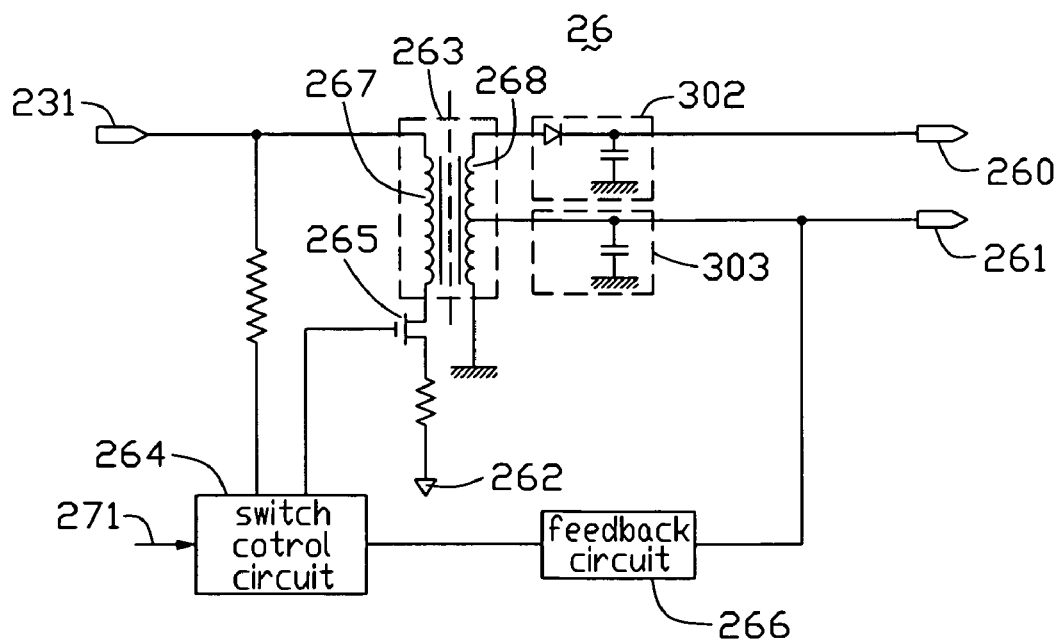
FIG. 2 is a circuit diagram of one embodiment of the main power supply of FIG. 1.

FIG. 2 is a circuit diagram of one embodiment of the main power supply 26 of FIG. 1. In one embodiment, the main power supply 26 includes a transformer 263, a switch control circuit 264, a transistor 265, and a feedback circuit 266.

The transformer 263 includes a primary winding 267 and a secondary winding 268. The primary winding 267 includes two terminals (not labeled). One of the terminals of the primary winding 267 is connected to the output terminal 231 of the commutating and filter circuit 23, and is also connected to the switch control circuit 264 via a resistor (not labeled). Another terminal of the primary winding 267 is connected to a source electrode (not labeled) of the transistor 265. The secondary winding 268 includes two terminals (not labeled) and a tap (not labeled). One of the terminals of the secondary winding 268 is connected to the first output terminal 260 of the main power supply 26 via a commutating and filter circuit (not labeled), and another terminal is connected to ground. The tap of the secondary winding 268 is connected to the second output terminal 261 of the main power supply 26 via another commutating and filter circuit (not labeled).

The switch control circuit 264 is connected to the first output terminal 271 of the stand-by control circuit 27. The switch control circuit 264 is also connected to a gate electrode (not labeled) of the transistor 265. A drain electrode (not labeled) of the transistor 265 is connected to ground via a resistor (not labeled). The feedback circuit 266 is connected between the second output terminal 261 of the main power supply 26 and the switch control circuit 264.

Figure 3:
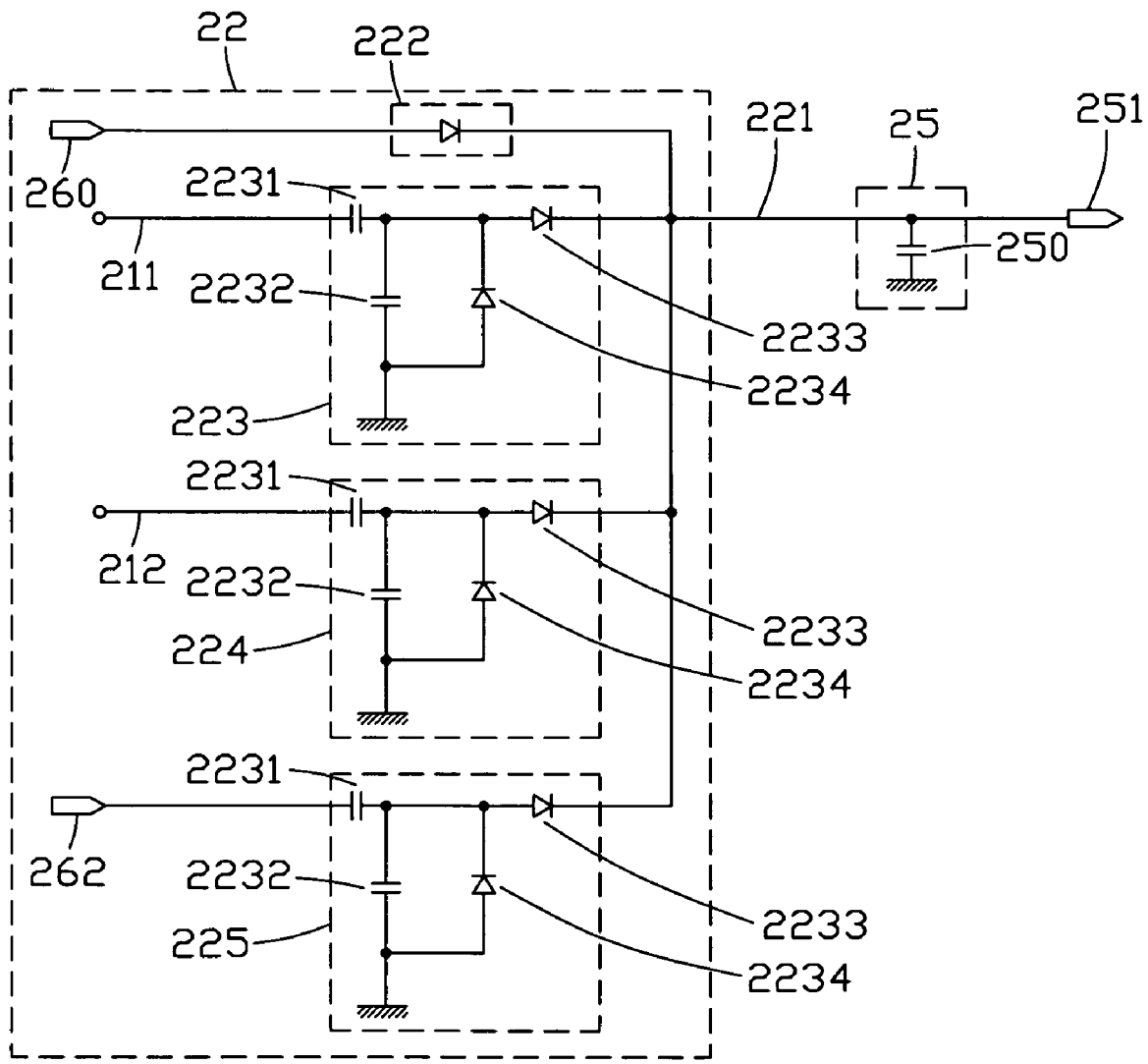
FIG. 3 is a circuit diagram of one embodiment of the voltage conversion circuit and the energy storage circuit of FIG. 1.

FIG. 3 is a circuit diagram of one embodiment of the voltage conversion circuit 22 and the energy storage circuit 25 of FIG. 1. The energy storage circuit 25 includes an energy storage capacitor 250. The energy storage capacitor 250 is connected between the output terminal 251 and ground. In one embodiment, the voltage conversion circuit 22 includes a large voltage conversion circuit 222, a first small voltage conversion circuit 223, a second small voltage conversion circuit 224, and a third small voltage conversion circuit 225.

The large voltage conversion circuit 222 includes a diode (not labeled). An anode of the diode is connected to the first output terminal 260 of the main power supply 26, and a cathode of the diode is connected to the output terminal 221 of the voltage conversion circuit 22.

The first small voltage conversion circuit 223 is connected between the first input terminal 211 of the power supply circuit 20 and the output terminal 221 of the voltage conversion circuit 22. The second small voltage conversion circuit 224 is connected between the second input terminal 212 of the power supply circuit 20 and the output terminal 221 of the voltage conversion circuit 22. The third small voltage conversion circuit 225 is connected between the third output terminal 262 of the main power supply 26 and the output terminal 221 of the voltage conversion circuit 22. The first small voltage conversion circuit 223, the second small voltage conversion circuit 224, and the third small voltage conversion circuit 225 may have the same structure.

Each of the small voltage conversion circuits 223, 224,225 includes a first capacitor 2231, a second capacitor 2232, a first diode 2233, and a second diode 2234. The second capacitor 2232 is connected between an anode of the first diode 2233 and ground. A cathode of the first diode 2233 is connected to the output terminal 221. A cathode of the second diode 2234 is connected to the anode of the first diode 2233, and an anode of the second diode 2234 is connected to ground. The first capacitor 2231 of the first small voltage conversion circuit 223 is connected between the anode of the first diode 2233 of the first small voltage conversion circuit 223 and the first input terminal 211. The first capacitor 2231 of the second small voltage conversion circuit 224 is connected between the anode of the first diode 2233 of the second small voltage conversion circuit 224 and the second input terminal 212. The first capacitor 2231 of the third small voltage conversion circuit 225 is connected between the anode of the first diode 2233 of the third small voltage conversion circuit 225 and the third output terminal 262 of the main power supply 26. In another embodiment, the first capacitor 2231 of the third small voltage conversion circuit 225 can be replaced by a resistor or an inductor.

When the main power supply 26 operates, the large voltage conversion circuit 222 and the small voltage conversion circuit 223, 224, 225 all supply the energy storage capacitor 250 of the energy storage circuit 25. When the main power supply 26 is in a stand-by state, only the small voltage conversion circuit 223, 224, 225 supply the energy storage capacitor 250.

Figure 4:
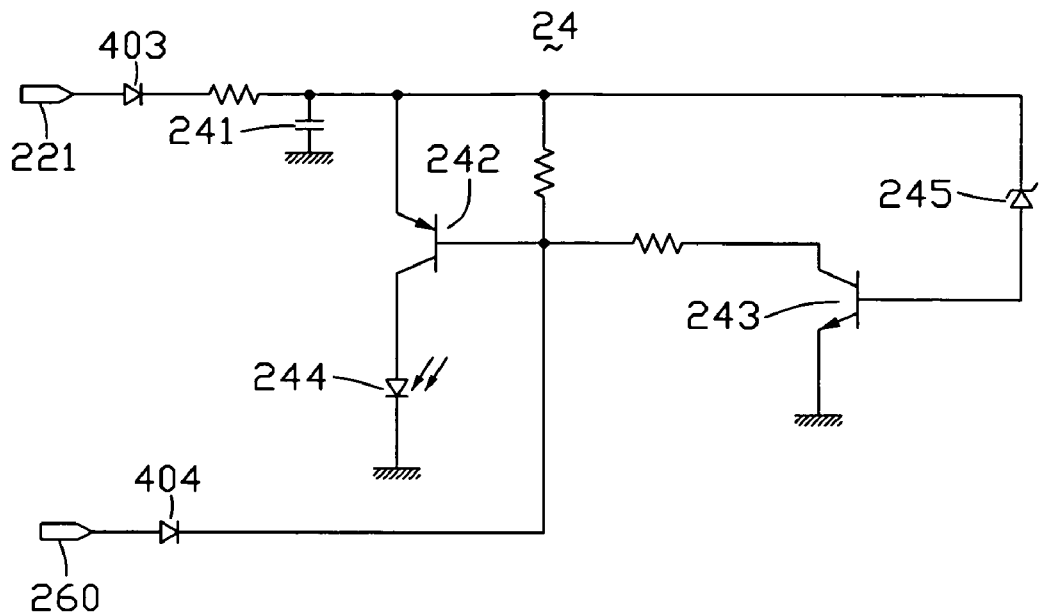
FIG. 4 is a circuit diagram of one embodiment of the stand-by pilot circuit of FIG. 1.

FIG. 4 is a circuit diagram of one embodiment of the stand-by pilot circuit 24 of FIG. 1. In one embodiment, the stand-by pilot circuit 24 includes a capacitor 241, a first transistor 242, a second transistor 243, a light emitting diode 244, a third diode 403, a fourth diode 404, and a zener diode 245. The first transistor 242 is a positive-negative-positive (PNP) bipolar transistor, and the second transistor 243 is a negative-positive-negative (NPN) bipolar transistor. However, it may be understood that first transistor 242 and the second transistor 243 may be replaced by a P-channel metal oxide semiconductor (PMOS) transistor and a N-channel metal oxide semiconductor (NMOS) depending on the embodiment.

An emitter (not labeled) of the first transistor 242 is connected to a cathode of the third diode 403 via a resistor (not labeled), and an anode of the third diode 403 is connected to the output terminal 221 of the voltage conversion circuit 22. The emitter of the first transistor 242 is also connected to ground via the capacitor 241. A collector (not labeled) of the first transistor 242 is connected to an anode of the light emitting diode 244, and a cathode of the light emitting diode 244 is connected to ground. A base (not labeled) of the first transistor 242 is connected to a cathode of the fourth diode 404, and an anode of the fourth diode 404 is connected to the first output terminal 260 of the main power supply 26. The base of the first transistor 242 is also connected to the emitter of the first transistor 242 via a resistor (not labeled). A collector (not labeled) of the second transistor 243 is connected to the base of the first transistor 242 via a resistor (not labeled). An emitter (not labeled) of the second transistor 243 is connected to ground. A base (not labeled) of the second transistor 243 is connected to an anode of the zener diode 245. A cathode of the second transistor 243 is connected to the emitter of the first transistor 242.

When the main power supply 26 operates, the voltage, for example, 26V, outputted from the first output terminal 260 is loaded on the base of the first transistor 242. The first transistor 242 is turned off, and the light emitting diode 244 is turned off.

When the main power supply 26 is in the stand-by state, the voltage outputted from the first output terminal 260 is about zero. The voltage conversion circuit 22 charges the capacitor 241 via the output terminal 221. When voltage of the capacitor 241 reaches a certain value, the zener diode 245 is turned on. The second transistor 243 is turned on correspondingly. The base of the first transistor 242 is pulled down to a low level via the actived second transistor 243. The first transistor 242 is turned on correspondingly. The capacitor 241 discharges via the first transistor 242 and the light emitting diode 244, and the light emitting diode 244 emits light.

When the voltage of the capacitor 241 discharges to a certain value, the zener diode 245 is turned off. The first transistor 242 and the second transistor 243 are turned off, the light emitting diode 244 stops emitting lights, correspondingly. The small voltage conversion circuit 223, 224, 225 charge the capacitor 241 again. When the voltage of the capacitor 241 reaches the certain value, the light emitting diode 244 emits light again. That is, the capacitor 241 is charged and discharged continuously when the main power supply 26 is in the stand-by state and the light emitting diode 244 flicks continuously. This indicates that the power supply circuit 20 is in the stand-by state.

Figure 5:
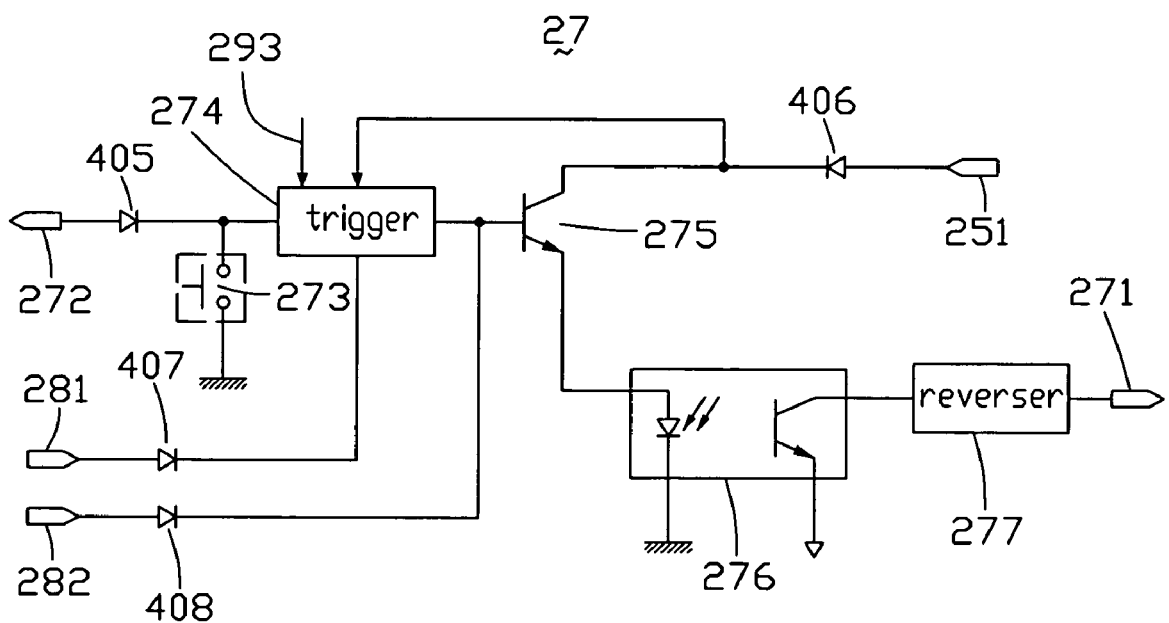
FIG. 5 is a circuit diagram of one embodiment of the stand-by control circuit of FIG. 1.

FIG. 5 is a circuit diagram of one embodiment of the stand-by control circuit 27 of FIG. 1. The stand-by control circuit 27 includes a switch 273, a trigger 274, a transistor 275, an optical coupler 276, a fifth diode 405, a sixth diode 406, a seventh diode 407, an eighth diode 408, and a reverser 277. The switch 273 is used for manually controlling the power supply circuit 20 by the user. The switch 273 can be a touch switch, a unidirectional switch, or a bidirectional switch depending on the embodiment. The transistor 275 can be an NPN bipolar transistor or a metal-oxide-semiconductor field-effect transistor.

The switch 273 includes two terminals. One of the terminals of the switch 273 is connected to the trigger 274, and the terminal is also connected to a cathode of the fifth diode 405. The other terminal is connected to ground. An anode of the fifth diode 405 is connected to the second output terminal 272 of the stand-by control circuit 27. A base of the transistor 275 is connected to the trigger 274. An emitter of the transistor 275 is connected to an anode of a light emitting diode of the optical coupler 276. A collector of the transistor 275 is connected to the trigger 274. The collector of the transistor 275 is also connected to a cathode of the sixth diode 406, and an anode of the sixth diode 406 is connected to the output terminal 251 of the energy storage circuit 25. The output terminal 271 of the stand-by control circuit 27 is connected to a collector of a phototransistor of the optical coupler 276 via the reverser 277. A cathode of a light emitting diode of the optical coupler 276 is connected to ground, and an emitter of a phototransistor of the optical coupler 276 is connected to ground. The first output terminal 281 of the microprocessor 28 is connected to an anode of the seventh diode 407, and a cathode of the seventh diode 407 is connected to the trigger 274. The second output terminal 282 of the microprocessor 28 is connected to an anode of the eighth diode 408, and a cathode of the eighth diode 408 is connected to the base of the transistor 275. The trigger 274 is also connected to the second output terminal 293 of the stand-by detecting circuit 29.

When the power supply circuit 20 is in the stand-by state, the main power supply is shut down. Therefore, energy consumption of the power supply circuit 20 decreases compared to conventional art.

Figure 6:
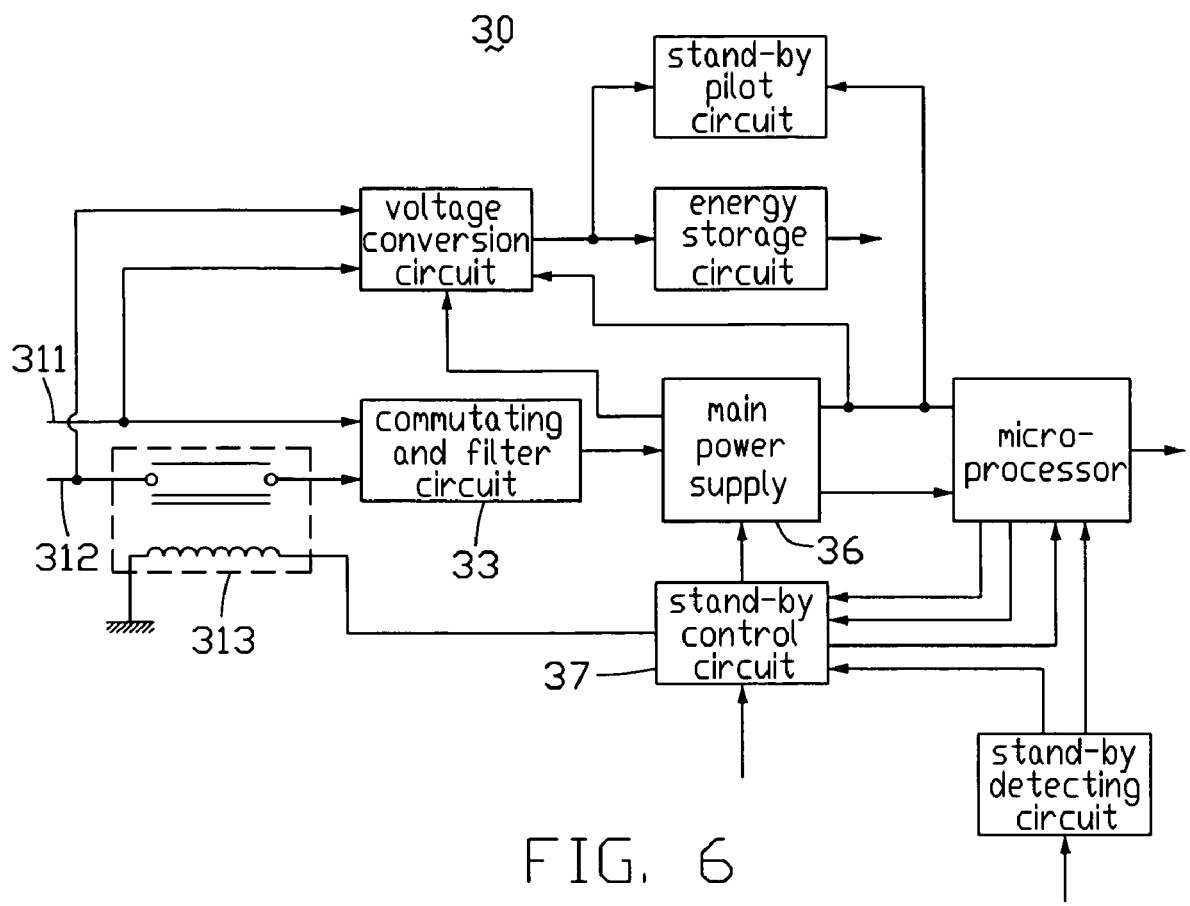
FIG. 6 is a schematic view of a power supply circuit according to a second embodiment of the present disclosure.
Figure 7:
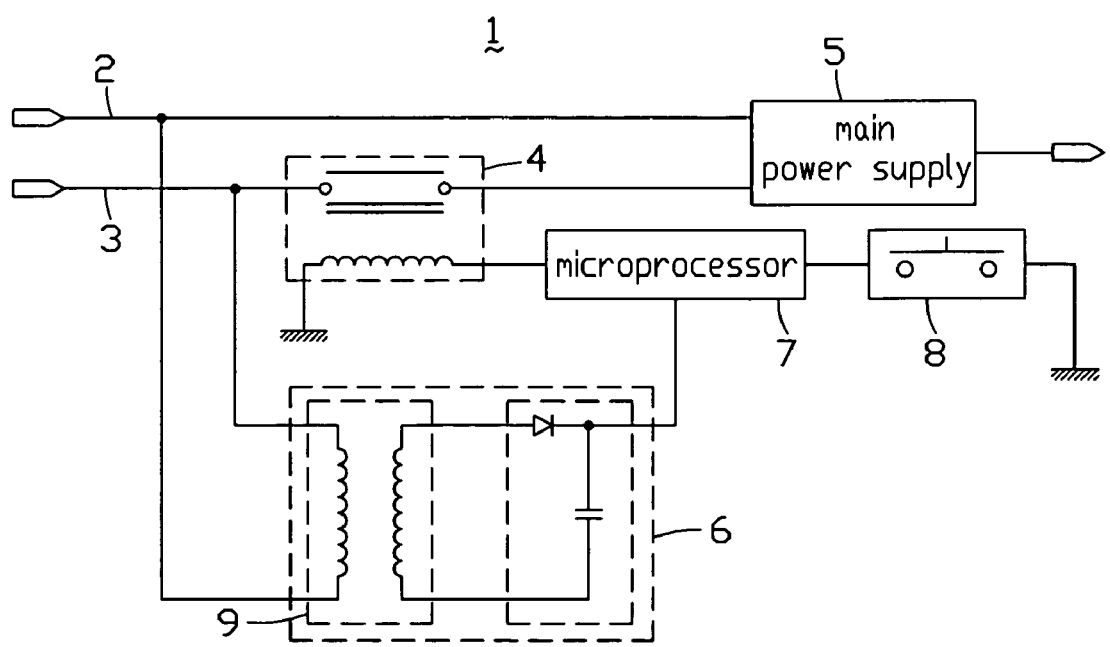
FIG. 7 is a schematic view of a conventional power supply circuit.

FIG. 6 is a schematic view of a power supply circuit 30 according to a second embodiment of the present disclosure. The power supply circuit 30 is similar to the power supply circuit 20. However, the power supply circuit 30 further includes a relay 313. The second input terminal 212 is connected to the commutating and filter circuit 33 via the relay 313. When the power supply circuit 30 is in the stand-by state, the stand-by control circuit 37 outputs a control signal to turn off the relay 313. The power supply circuit 30 is turned off correspondingly.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit configured for supplying power for a load, comprising:
   a main power supply configured for converting a received voltage into a required direct current voltage;
   a microprocessor;
   a stand-by control circuit configured for controlling the main power supply, the stand-by control circuit comprising a switch, a trigger, a transistor, an optical coupler, a reverser, a first output terminal and a second output terminal, the switch comprising a first terminal and a second terminal, the first terminal of the switch connected between the second output terminal and the trigger, the second terminal of the switch connected to ground, a control electrode of the transistor connected to the trigger, a first terminal of the transistor connected to the trigger, a second terminal of the transistor connected to the optical coupler, the first output terminal of the stand-by control circuit connected to the optical coupler via the reverser, the reverser connected to the main power supply, the trigger and the control electrode of the transistor further connected to the microprocessor;

an energy storage circuit comprising an output terminal connected to the first terminal of the transistor, and the energy storage circuit supplying power for the trigger and the transistor of the stand-by control circuit via the output terminal;

wherein in response to when the load stops operating, the microprocessor outputs a switch-off signal to the control electrode of the stand-by control circuit in order to switch off the transistor, the reverser of the stand-by control circuit correspondingly outputs a first control signal to turn off the main power supply; and in response to when the load starts to operate, the trigger outputs a switch-on control signal to the control electrode of the stand-by control circuit in order to switch on the transistor, the reverser of the stand-by control circuit correspondingly outputs a second control signal to turn on the main power supply, and the main power supply charges the energy storage circuit.

2. The power supply circuit of claim 1, wherein the energy storage circuit comprises an energy storage capacitor connected between the trigger and ground.

3. The power supply circuit of claim 1, further comprising a stand-by detecting circuit, the stand-by detecting circuit is configured for detecting operation conditions of the load and outputs correspondingly control signals to the microprocessor and the trigger of the stand-by control circuit.

4. The power supply circuit of claim 1, wherein the power supply circuit further comprises a voltage conversion circuit configured for supplying direct current voltages to the energy storage circuit, the voltage conversion circuit comprises a first small voltage conversion circuit and a second small voltage conversion circuit, the first small voltage conversion circuit and the second small voltage conversion circuit receive external alternate current voltages, convert the external alternate current voltages into the direct current voltages and supply the direct current voltages to the energy storage circuit.

5. The power supply circuit of claim 4, wherein the voltage conversion circuit further comprises a third small voltage conversion circuit, the transformer comprises a primary winding comprising a first terminal and a second terminal and a secondary winding comprising a first terminal and a second terminal, the first terminal of the primary winding is connected to the commutating and filter circuit, the second terminal of the primary winding is connected to the third small voltage conversion circuit via the transistor, the first terminal of the secondary winding is connected to the microprocessor, and the second terminal of the secondary winding is connected to ground, the third small voltage conversion circuit receives the voltages outputted from the transformer and supplies a corresponding direct current voltage to the energy storage circuit.

6. The power supply circuit of claim 5, wherein each of the small voltage conversion circuit comprises a commutating and filter circuit.

7. The power supply circuit of claim 4, further comprising a stand-by pilot circuit, wherein the stand-by pilot circuit receives the voltages outputted from the main power supply and displays operation conditions of the main power supply.

8. The power supply circuit of claim 7, wherein the stand-by pilot circuit comprises a capacitor, a first transistor, a second transistor, a light emitting diode, and a zener diode; an emitter of the first transistor is connected to the voltage conversion circuit, a collector of the first transistor is connected to an anode of the light emitting diode, a cathode of the light emitting diode is connected to ground, a base of the first transistor is connected to the main power supply, the base of the first transistor is also connected to the emitter of the first transistor via a resistor; a collector of the second transistor is connected to the base of the first transistor via a resistor, an emitter of the second transistor is connected to ground, a base of the second transistor is connected to an anode of the zener diode, a cathode of the zener diode is connected to the emitter of the first transistor, one plate of the capacitor is connected between an output terminal of the voltage conversion circuit and the emitter of the first transistor, and the other plate of the capacitor is connected to ground.

9. The power supply circuit of claim 1, wherein when the switch of the stand-by control circuit is switched on, the switch correspondingly outputs a starting signal to the trigger and the microprocessor respectively, the trigger receives the starting signal and correspondingly outputs the switch-on signal to the control electrode of the stand-by control circuit in order to switch on the transistor, the microprocessor receives the starting signal and correspondingly outputs a first locking signal to the trigger and a second locking signal to the transistor in order to lock the working state of the trigger and the transistor.

10. The power supply circuit of claim 9, wherein when the switch of the stand-by control circuit is switched off, the switch correspondingly outputs a standby signal to the microprocessor, and the microprocessor receives the stand-by signal and correspondingly outputs the switch-off signal to the control electrode of the stand-by control circuit in order to switch off the transistor.

11. The power supply circuit of claim 3, wherein when the stand-by detecting circuit detects that the load is in an operation state, the stand-by detecting circuit correspondingly outputs a starting signal of the control signals to the trigger, the trigger receives the starting signal from the stand-by detecting circuit and correspondingly outputs the switch-on signal to the control electrode of the stand-by control circuit, in order to switch on the transistor.

12. The power supply circuit of claim 11, wherein when the stand-by detecting circuit detects that the load is in a stand-by state, the stand-by detecting circuit correspondingly outputs a stand-by signal of the control signals to the microprocessor, the microprocessor receives the stand-by signal from the stand-by detecting circuit and correspondingly outputs the switch-off signal to the control electrode of the stand-by control circuit in order to switch off the transistor.

13. A power supply circuit configured for supplying power for a load, comprising:
 a main power supply configured to convert a received voltage into a required direct current voltage;
 a microprocessor;
 a stand-by control circuit configured to control the main power supply;
 a stand-by pilot circuit configured to receive the voltage outputted from the main power supply and display operation conditions of the main power supply, the stand-by pilot circuit comprising a capacitor, a first transistor, a second transistor, a light emitting diode, and a zener diode, an emitter of the first transistor connected to the voltage conversion circuit, a collector of the first transistor connected to an anode of the light emitting diode, a cathode of the light emitting diode connected to ground, a base of the first transistor connected to the main power supply, the base of the first transistor connected to the emitter of the first transistor via a resistor, a collector of the second transistor connected to the base of the first transistor via a resistor, an emitter of the second transistor connected to ground, a base of the second transistor connected to an anode of the zener diode, a cathode of the zener diode connected to the emitter of the first transistor, the capacitor connected between the emitter of the first transistor and ground;

an energy storage circuit configured for supplying power for the stand-by control circuit;

a voltage conversion circuit connected to the energy storage circuit and the first plate of the capacitor of the stand-by pilot circuit, and the voltage conversion circuit configured to convert a received alternate voltage into a direct current voltage and supply the direct current voltage to the energy storage circuit and the stand-by pilot circuit;

wherein in response to when the load stops operating, the microprocessor outputs a switch-off signal to the stand-by control circuit, the stand-by control circuit outputs a first control signal to turn off the main power supply; and in response to when the load starts to operate, the stand-by control circuit correspondingly outputs a second control signal to turn on the main power supply, and the main power supply charges the energy storage circuit.

14. The power supply circuit of claim 13, wherein the stand-by control circuit comprises a switch, a trigger, a transistor, an optical coupler, a reverser, a first output terminal and a second output terminal, the switch comprising a first terminal and a second terminal, the first terminal of the switch connected between the second output terminal of the stand-by control circuit and the trigger, the second terminal of the switch connected to ground, a control electrode of the transistor connected to the trigger, a first terminal of the transistor connected to the trigger and the energy storage circuit, a second terminal of the transistor connected to the optical coupler, the first output terminal of the stand-by control circuit connected to the optical coupler via the reverser, the reverser connected to the main power supply, the trigger and the control electrode of the transistor further connected to the microprocessor.

15. The power supply circuit of claim 14, wherein in response to when the load stops operating, the microprocessor outputs the switch-off signal to the control electrode of the stand-by control circuit in order to switch off the transistor, the reverser of the stand-by control circuit correspondingly outputs the first control signal to turn off the main power supply; and in response to when the load starts to operate, the trigger outputs a switch-on signal to the control electrode of the stand-by control circuit in order to switch on the transistor, the reverser of the stand-by control circuit correspondingly outputs the second control signal to turn on the main power supply, and the main power supply charges the energy storage circuit.

16. The power supply circuit of claim 15, wherein when the switch of the stand-by control circuit is switched on, the switch correspondingly outputs a starting signal to the trigger and the microprocessor respectively, the trigger receives the starting signal and correspondingly outputs the switch-on signal to the control electrode of the stand-by control circuit in order to switch on the transistor, the microprocessor receives the starting signal and correspondingly outputs a first locking signal to the trigger and a second locking signal to the transistor in order to lock the working state of the trigger and the transistor.

17. The power supply circuit of claim 16, wherein when the switch of the stand-by control circuit is switched off, the switch correspondingly outputs a standby signal to the microprocessor, and the microprocessor receives the stand-by signal and correspondingly outputs the switch-off signal to the control electrode of the stand-by control circuit in order to switch off the transistor.

18. The power supply circuit of claim 13, wherein the voltage conversion circuit comprises a first small voltage conversion circuit and a second small voltage conversion circuit, the first small voltage conversion circuit and the second small voltage conversion circuit receive external alternate current voltages, convert the external alternate current voltages into the direct current voltages and supply the direct current voltages to the energy storage circuit.

19. The power supply circuit of claim 18, wherein the voltage conversion circuit further comprises a third small voltage conversion circuit, the transformer comprises a primary winding comprising a first terminal and a second terminal and a secondary winding comprising a first terminal and a second terminal, the first terminal of the primary winding is connected to the commutating and filter circuit, the second terminal of the primary winding is connected to the third small voltage conversion circuit via the transistor, the first terminal of the secondary winding is connected to the microprocessor, and the second terminal of the secondary winding is connected to ground, the third small voltage conversion circuit receives the voltages outputted from the transformer and supplies a corresponding direct current voltage to the energy storage circuit.

20. A power supply circuit configured for supplying power for a load, comprising:
 a main power supply configured for converting a received voltage into a required direct current voltage;
 a commutating and filter circuit configured for converting external alternate current (AC) voltages into direct current (DC) voltages and supplying the DC voltages for the main power supply;
 a microprocessor;
 a stand-by control circuit configured for controlling the main power supply, wherein the stand-by control circuit comprises a switch comprising a first terminal and a second terminal, a trigger, a transistor, an optical coupler, and a reverser; the first terminal of the switch is connected to the trigger, the second terminal of the switch is connected to ground; a control electrode of the transistor is connected to the trigger, a first terminal of the transistor is connected to the trigger, a second terminal of the transistor is connected to the optical coupler; the reverser is connected to the optical coupler;
 an energy storage circuit configured for supplying power for the stand-by control circuit;
 wherein the main power supply comprises a transformer configured for converting the DC voltages into AC voltages; a transistor configured for switching on or switching off the main power supply, a switch control circuit configured for turning on or turning off the transistor, and a feedback circuit configured for feeding back the voltages outputted from the transformer to the switch control circuit;
 wherein in response to when the load stops operating, the microprocessor outputs a control signal to the stand-by control circuit, the stand-by control circuit outputs a corresponding control signal to turn off the main power supply; and in response to when the load starts to operate, the stand-by control circuit outputs a corresponding control signal to turn on the main power supply, and the main power supply charges the energy storage circuit.

* * * * *